United States Patent [19]
Wei et al.

[11] Patent Number: 6,043,860
[45] Date of Patent: Mar. 28, 2000

[54] METHOD FOR REDUCING STABILIZATION TIME FOR AN LCD USING VOLTAGE AND RADIATION

[75] Inventors: Chung-Kuang Wei; Chen-Lung Kuo; Yong-Hong Lu; Chieh-Li Chen, all of Hsinchu, Taiwan

[73] Assignee: Industrial Technology Research Institute, Hsin-Chu, Taiwan

[21] Appl. No.: 09/044,060

[22] Filed: Mar. 19, 1998

[51] Int. Cl.[7] .............................. G02F 1/13; G02F 1/1337
[52] U.S. Cl. ............................................ 349/187; 349/191
[58] Field of Search .............................. 349/86, 122, 187, 349/191

[56] References Cited

U.S. PATENT DOCUMENTS

| | | | |
|---|---|---|---|
| 4,813,771 | 3/1989 | Handschy et al. | 350/350 |
| 5,243,451 | 9/1993 | Kahemoto et al. | 359/53 |
| 5,410,422 | 4/1995 | Bos | 359/73 |
| 5,491,001 | 2/1996 | Mazaki et al. | 427/162 |
| 5,726,728 | 3/1998 | Wei et al. | 349/122 |

*Primary Examiner*—Walter Malinowski
*Attorney, Agent, or Firm*—George O. Saile; Stephen B. Ackerman

[57] ABSTRACT

A method for manufacturing a liquid crystal display having both wide angle viewing and fast response is described. A key feature of the method is the addition to the liquid crystal of a small amount of a monomer, selected from among the diacrylates or the monoacrylates, as well as a chiral dopant. Once the display has been assembled, the usual turn-on voltage (about 5 volts) is applied. After allowing the orientations of the directors to stabilize, the liquid crystal is irradiated with ultraviolet light for a few seconds. This causes the dissolved monomer to polymerize in place. The UV irradiation and applied voltage are then terminated. Defects that slow down the director stabilization are now prevented from re-forming so that the next time voltage is applied, the system responds in a few milliseconds. Adding a photoinitiator, in addition to the monomer, is an option.

20 Claims, 7 Drawing Sheets

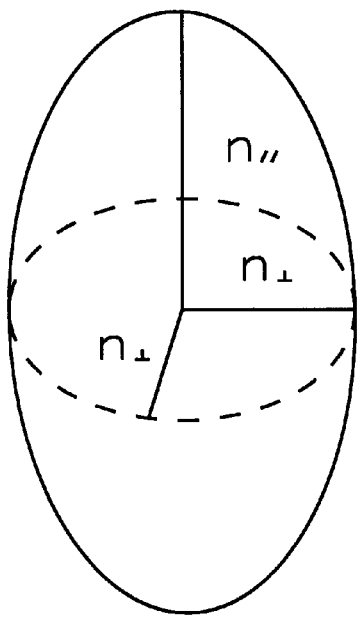
FIG. 1A - Prior Art
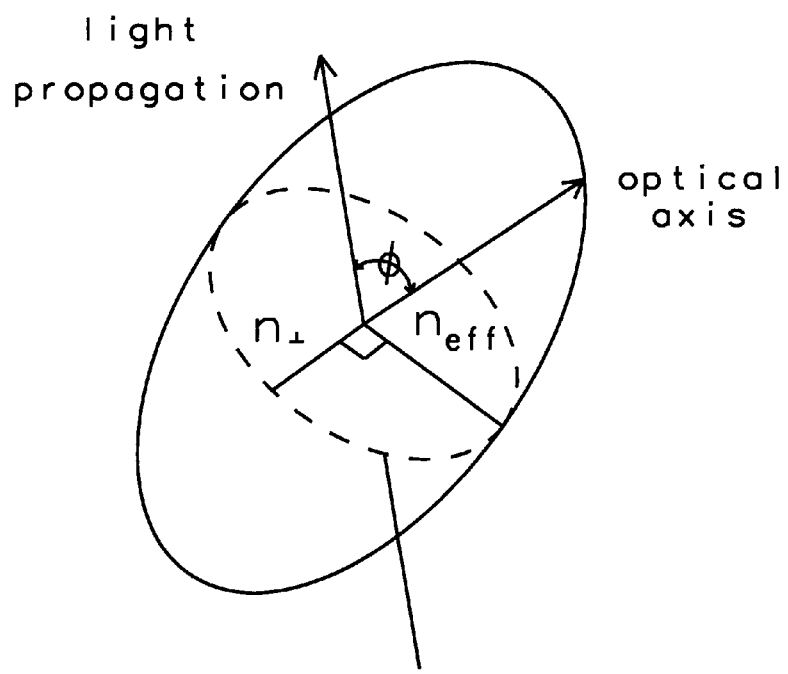
FIG. 1B - Prior Art

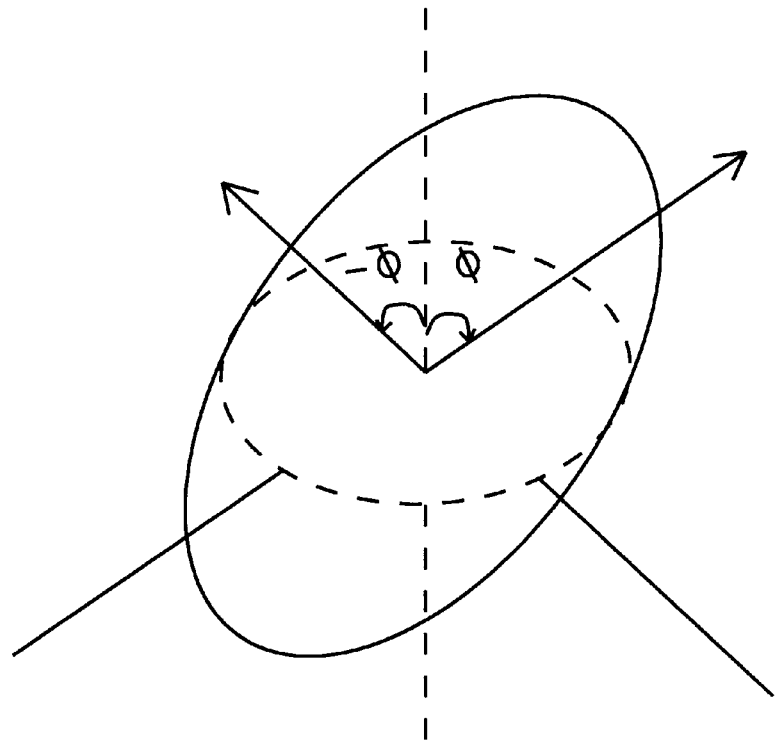
*FIG. 1C – Prior Art*
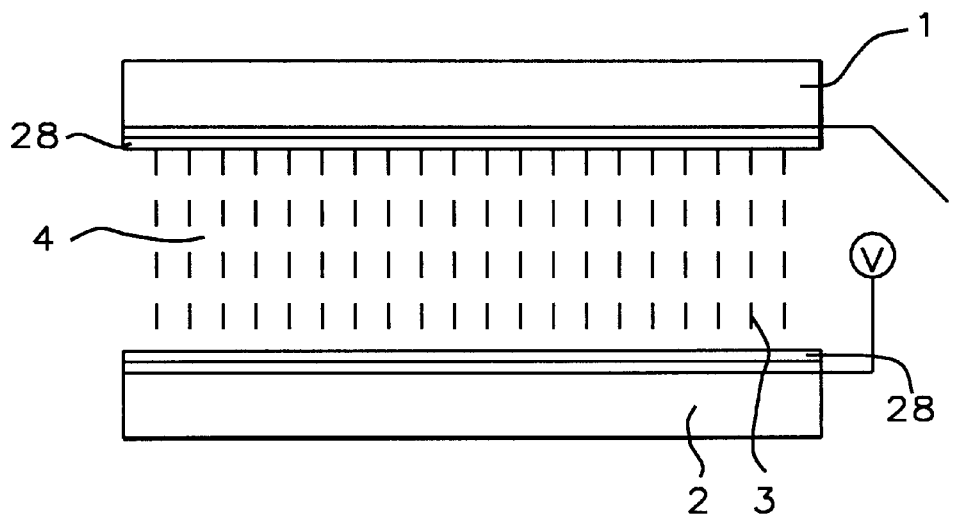
*FIG. 2A*

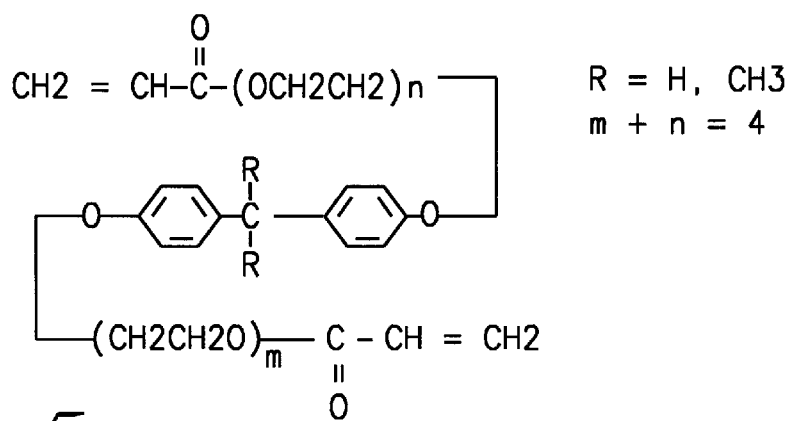
FIG. 5
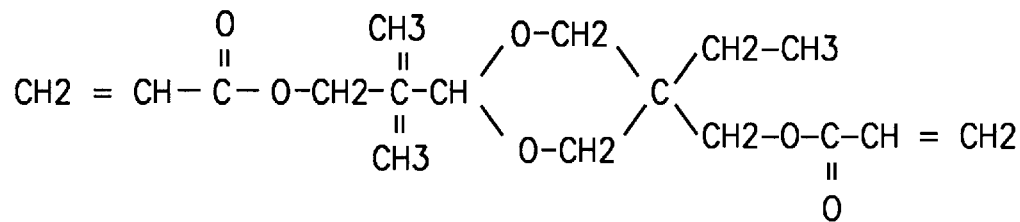
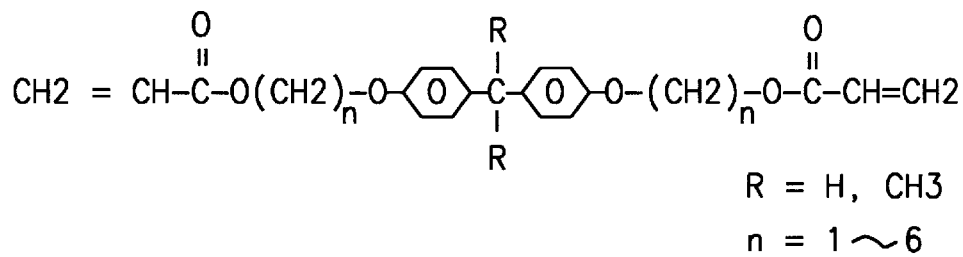
FIG. 6
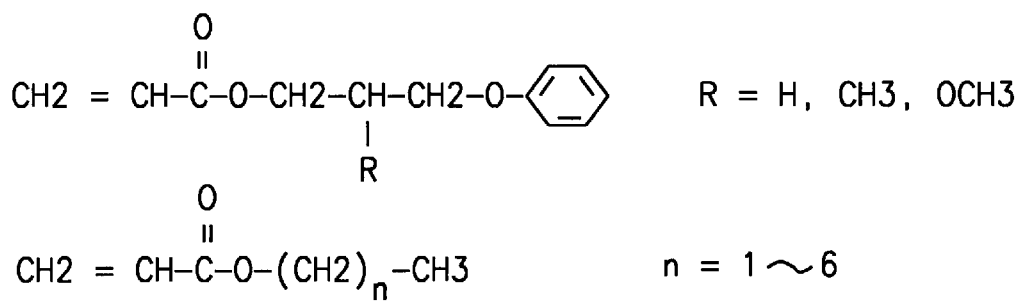
FIG. 7

| Acronym | Structure |
|---|---|
| CN | 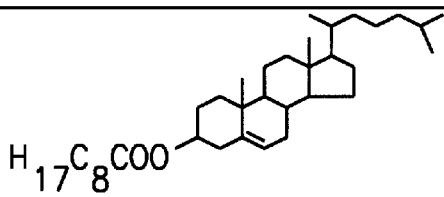 $H_{17}C_8COO$ |
| S-811 | 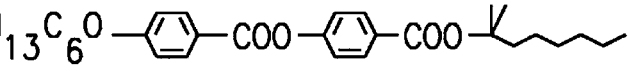 $H_{13}C_6O$—⟨⟩—COO—⟨⟩—COO— |
| R-811 | Enantiomer to S-811 |
| C-15 | 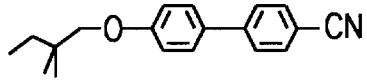 —O—⟨⟩—⟨⟩—CN |
| CB-15 | 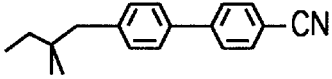 —⟨⟩—⟨⟩—CN |
| S-1011 | 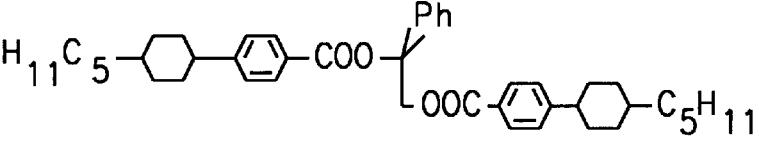 $H_{11}C_5$—⟨⟩—⟨⟩—COO— Ph / OOC—⟨⟩—⟨⟩—$C_5H_{11}$ |
| R-1011 | Enantiomer of S-1011 |
| S-2011 | 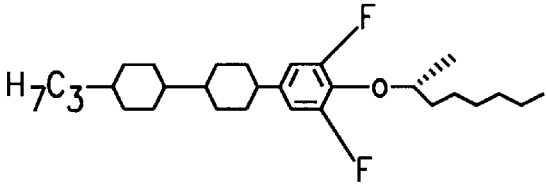 $H_7C_3$—⟨⟩—⟨⟩—⟨F,F⟩—O— |
| R-2011 | Enantiomer of S-2011 |
FIG. 10

METHOD FOR REDUCING STABILIZATION TIME FOR AN LCD USING VOLTAGE AND RADIATION

BACKGROUND OF THE INVENTION

(1) Field of the Invention

The invention relates to the general field of liquid crystal displays (LCDs), more particularly to methods for improving response time together with providing wider viewing angle capability, and specifically to mixing Nematic Liquid Crystal (NLC) with chiral dopant and a monomer.

(2) Description of the Prior Art

The twisted nematic (TN) and super twisted nematic (STN) are widely used in liquid crystal displays. Characteristically, however, they suffer from narrow viewing angles when applied to a large panel. The viewing angle of a display is defined in FIG. 1A. If the viewing angle had perfect characteristics the optical performance would be the same, no matter from which direction a viewer sees the display.

The NLC is a kind of uniaxial material whose refractive index can be represented by an ellipsoid having three primary axes $n_\parallel$, $n_\perp$, and $n_\perp$, as shown in FIG. 1A. The longest axis of the ellipsoid is called the optical axis. FIG. 1B demonstrates that there are two eigen-modes of light propagating in an NLC. One is the ordinary wave, with refractive index $n_\perp$, while the electric field component of the light is perpendicular to the optic axis and the direction of propagation. The other is the extraordinary wave with refractive index $n_{eff}$, ranging from $n_\perp$ to $n_\parallel$ depending on the direction of the electric field, the electric field component of the light being in the same plane as the optic axis and the direction of propagation. If the angle between a light ray passing through the NLC and the optic axis is $\phi$, the refractive index of the extraordinary wave is $$n_{eff} = n_\parallel n_\perp / (n_\parallel^2 \sin^2\phi + n_\perp^2 \cos^2\phi)^{1/2}$$

It is self-evident that $n_{eff} \geq n_\perp$. Because the refractive indices of the ordinary and extraordinary waves are different, there is a phase retardation $\delta(\phi)$, a function of $(n_{eff} - n_\perp)$, defined as the difference in optical path between the extraordinary and ordinary wave propagating in the NLC. Under crossed polarizers, the phase retardation strongly determines the transmittance.

FIG. 1C demonstrates that phase retardation is different when a biassed TN LCD is viewed from a different viewing angle. The bias voltage makes the liquid crystal molecules incline at a tilt angle $\phi$ relative to the vertical. The corresponding refractive index of the extraordinary wave is $n_{eff}(2\phi)$ or $n_\perp$ while the entrance angle is $-\phi$ or $\phi$. As mentioned above, the phase retardation $\delta(2\phi)$ viewed from $-\phi$ and $\delta(0)$ viewed from $\phi$ will be different. As a result, the transmittance viewed from $-\phi$ and $\phi$ is also different. Furthermore, while watching the display panel along a tilt direction, the contrast will degrade and the gray scale could be inverse. The viewing angle of a conventional TN LCD is limited to +15° to −30° with contrast ratio greater than 10 and with gray scale inversion in the vertical viewing direction.

One approach to solving the viewing angle problem for TN LCDs is a wide viewing angle LCD with negative liquid crystal filled with an array of closed cylinders known as a gibbous lattice. Also, it has been shown in the prior art that high contrast LCDs can be obtained by using a negative NLC with pependicular boundary conditions on the glass substrates. In addition to causing symmetric alignment of NLC without a rubbing process, the closed cylinders (gibbous lattices) can also reduce the gray scale inversion.

In the gibbous lattice mode, lattice ridges of reduced height are used with the hope of reducing the light leakage induced by the NLC alignment around the ridges and of enlarging the aperture ratio of the display. However, a stabilized alignment of liquid crystals is difficult to obtain by alignment layers only and the optical response is too slow for this mode to be used in a display having full motion video. It could not cope with a LCD with wide viewing angle and high image quality.

In the course of searching the prior art, the following references were found to be of interest. Handschy et al. (U.S. Pat. No. 4,813,771 March 1989) shows electro-optic switching devices using ferroelectric liquid crystals. Bos (U.S. Pat. No. 5,410,422 April 1995) shows a greyscale LCD having a wide viewing angle. Kanemoto et al. (U.S. Pat. No. 5,243,451 September 1993) shows a LCD with cholesteric liquid crystal birefringent layers. Mazaki et al. (U.S. Pat. No. 5,491,001 February 1996) shows a method of producing a viewing angle compensator for a liquid crystal display. We also note here that one of the inventors (CK Wei) filed a related patent application on May 24 1997 (application Ser. No. 08/823,389).

SUMMARY OF THE INVENTION

It has been an object of the present invention to provide a method for manufacturing a liquid crystal display that has wide angle viewing capabilities and fast response time.

This has been achieved by adding to the liquid crystal a small amount of a monomer, selected from among the diacrylates or the monoacrylates, togther with a chiral dopant. Once the display has been assembled, the usual turn-on voltage (about 5 volts) is applied. After allowing the orientations of the directors to stabilize, the liquid crystal is irradiated with ultraviolet light for a few seconds. This causes the dissolved monomer to polymerize in place. The UV irradiation and applied voltage are then terminated. Defects that slow down the director stabilization are now prevented from re-forming so that the next time voltage is applied, the system responds in a few milliseconds. Adding a photoinitiator, in addition to the monomer, is an option.

BRIEF DESCRIPTION OF THE DRAWINGS

FIGS. 1A, 1B, and 1C illustrate the principles that determine how light propagates through a liquid crystal.

FIGS. 2A and 2B show how the directors are arranged, with and without applied voltage, in a negative NLC.

FIGS. 5 and 6 show chemical formulae for two classes of diacrylate monomers.

FIG. 7 shows the chemical formula for a class of monoacrylates.

FIG. 10 shows several examples of chiral dopants, listed by both their commercial designations and their structures.

DESCRIPTION OF THE PREFERRED EMBODIMENTS

Examples of the liquid crystals that are used with the display of the present invention include 95-465, 95-720, ZLI-2806, ZLI-2857, and ZLI-4788-000. Referring now to FIG. 2A, we show upper and lower substrates 1 and 2 respectively between which negative NLC 4 has been sandwiched. Even though there is no electric field present, the directors, such as 3, are all lined up and point in a direction normal to the substrates because a special alignment layer (shown as 28) has been used to cause all the liquid crystal molecules to line up at right angles to it.

When an electric field (shown as arrows 5 in FIG. 2B) is applied, the directors attempt to align themselves in a direction normal to the applied field. Liquid crystal molecules at each of the substrate surfaces (such as 6 in the figure) are constrained by their attraction and attachment to the alignment layers so this change in alignment takes place gradually, with the molecules at the mid-point between plates (such as 3) achieving the largest re-alignment. Typically said voltage difference will be between 0 and about 5 volts.

Figure 2B:
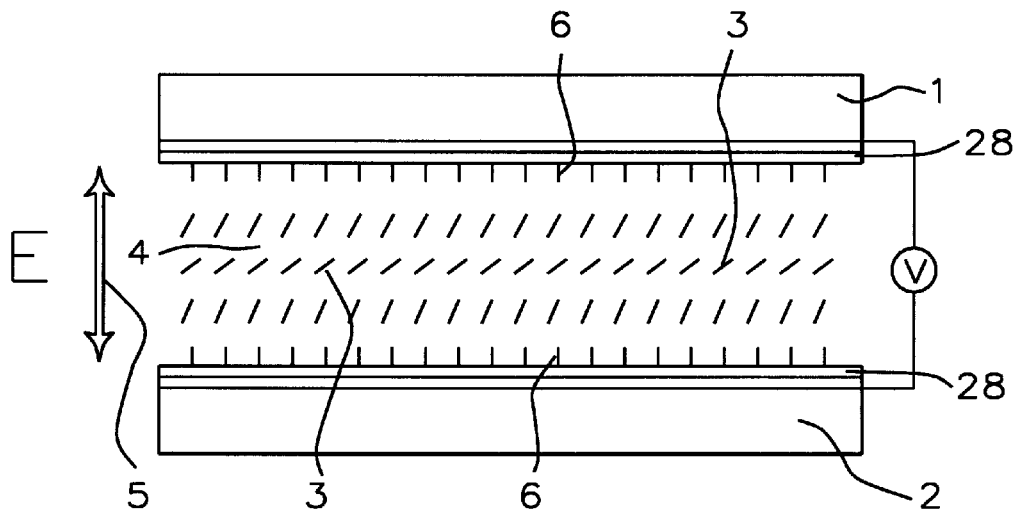
Figure 3A:
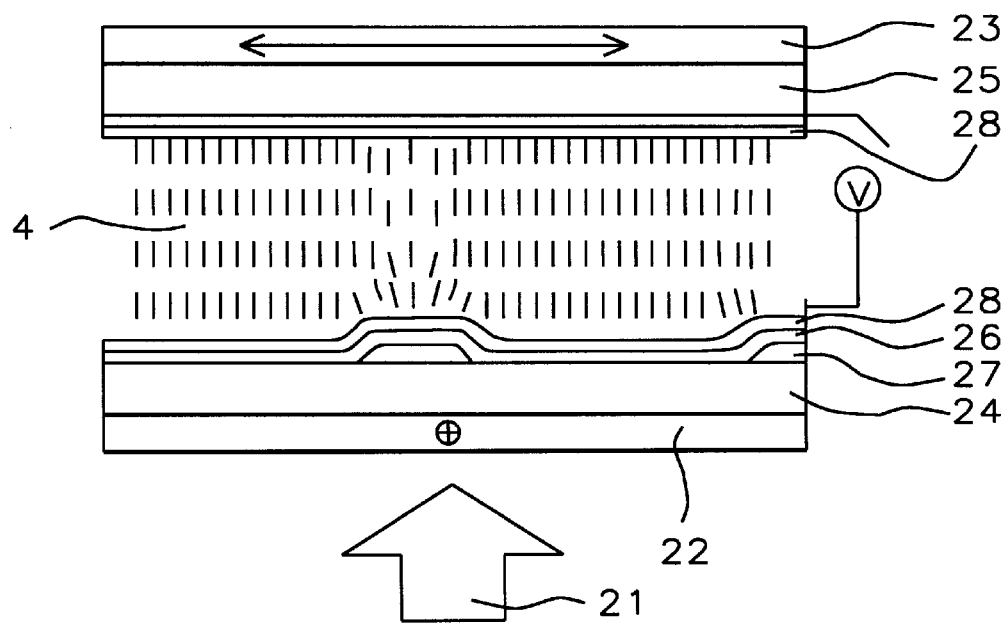
FIGS. 3A and 3B are cross-sections showing the positions of the polarizers and the appearance of the field generating stripes without and with applied voltage, respectively.
Figure 3B:
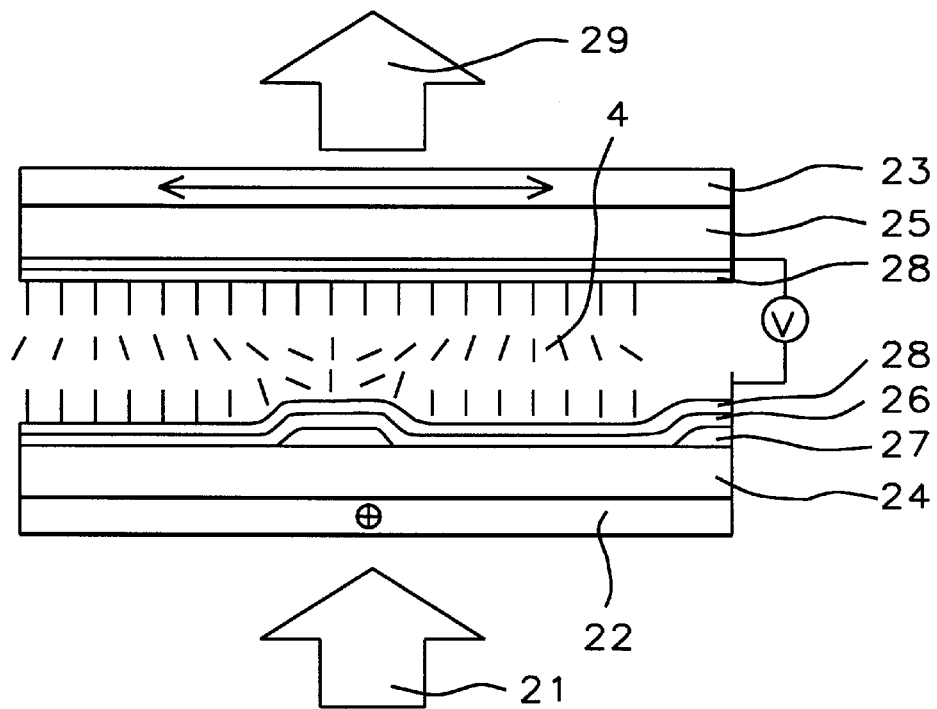

As already discussed, the design presented in FIG. 2B has a narrow viewing angle (because of the asymmetric alignment of the LC molecules) which the prior art has attempted to solve by using a gibbous lattice similar to that shown in FIGS. 3. FIG. 3A is a cross-section of a display, showing how incident light beam 21 passes through polarizer 22, lower substrate 24, photoresist layer 27 (forming the gibbous lattice), ITO 26, alignment layer 28, liquid crystal 4, layer 28, top substrate 25, and analyzer 23. V, the applied voltage across the plates, is 0 in this example (directors are aligned normal to the substrates) so no light will pass through analyzer 23. When V is about 5 volts, the twisted nematics form, as shown in FIG. 3B, so light will now pass through the analyzer and emerge as beam 29. This structure provides good viewing at angles as much as 70° off normal because it uses perpendicular alignment for the dark state, making the contrast ratio very high. Additionally, its symmetric alignment can reduce the gray scale inversion region. The distance between plates 24 and 25 is between about 1 and 10 microns.

Figure 4:
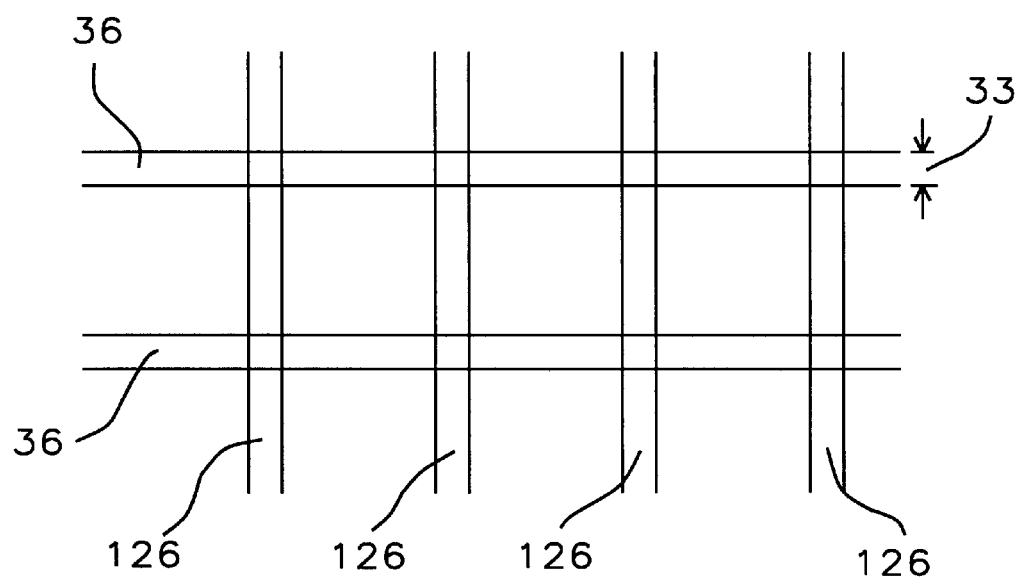
FIG. 4 is a plan view of part of FIG. 3.

FIG. 4 is a plan view looking down through top plate 25 at bottom plate 24. In particular, stripes 126, that lie on the inner surface of 24, are seen as well as orthogonal stripes 36. These stripes were made from photoresist and an overcoat material to form a gibbous lattice. Their width 33 is between about 1 and 50 microns. ITO was then coated on it. The thickness of the stripes is between about 0.1 and 5 microns.

As discussed above, the response time of this class of liquid crystals tends to be slow because there are many disclinations and singularities of the director field. The directors cannot reach their eqilibrium orientations until these mutually annihilate each other through recombination. This can take as long as 2.5 seconds, making the system less useful for displays.

We have overcome this problem as follows:
a small amount (between about 0.1 and 10 weight %) of a suitable monomer is first added to the liquid crystal. We have also found that the orientation of the directors can be made to reach stability more rapidly if a small amount of a chiral dopant is also added. Less than about 5% by weight of the latter will suffice. Among the monomers that we have found suitable we include the mono- and di-acrylates. FIGS. 5 and 6 show two examples of general classes of diacrylates while FIG. 7 shows a class of monoacrylates, where Ph represents a phenol group. In FIG. 10, we show several examples of chiral dopants suitable for use in this application.

Once the dislay has been assembled, including the modified liquid crystal, a voltage between about 0 and 5 volts is applied across the plates. While the voltage is on, the liquid crystal is irradiated with ultraviolet light (wavelength range between about 300 and 600 nm.) for between about 0.1 and 60 minutes. Photopolymerization of the monomer then occurs. Once the field is removed the liquid crystal has been stabilized and the disclinations and singularities discussed above are unable to reform randomly because the polymer network will 'memorize' the stable alignment.

Although the above described process has been found to work very well, an additional option is to include a photoinitiator, such as hydroquinone or AIBN (2.2'-azobis (isobutyronitrile)) along with the monomer and chiral dopant. The advantages of including a photoinitiator are that it quickly initiates photopolymerization, thereby reducing the exposure time. An effective amount of photoinitiator has been found to be between about 0 and 5 weight %.

Figure 8:
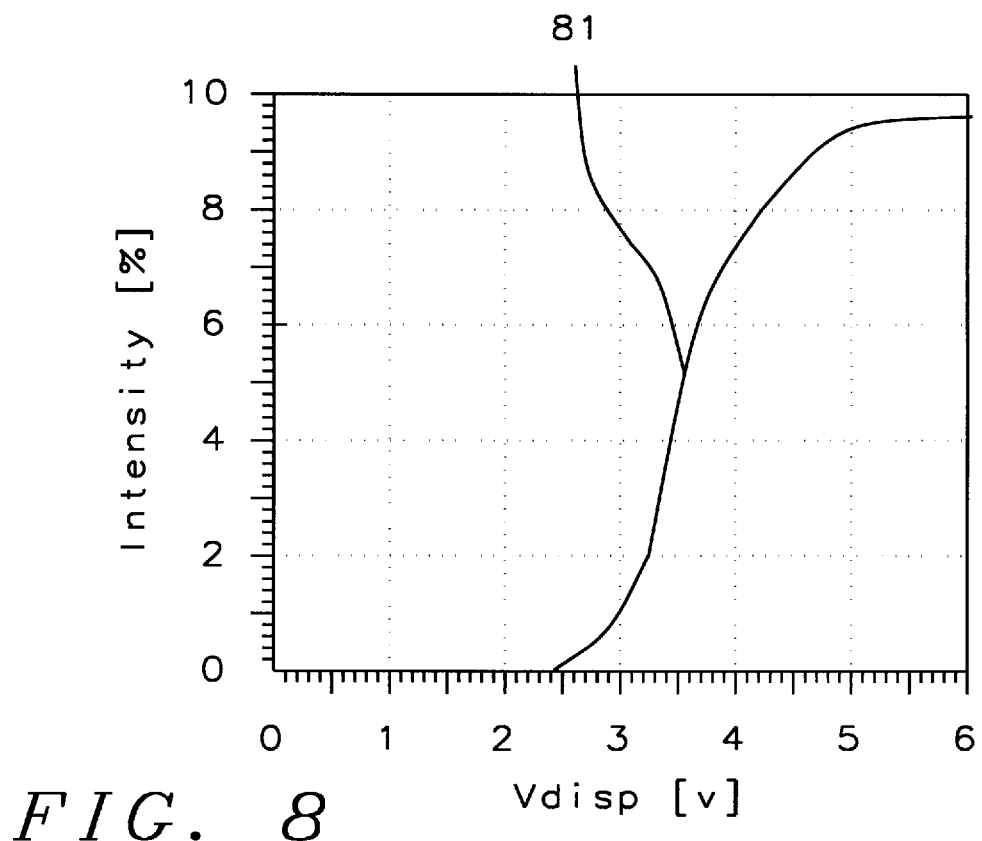
FIG. 8 is a plot of transmitted intensity vs. voltage for a liquid crystal that has been stabilized according to the method of the present invention.
Figure 9:
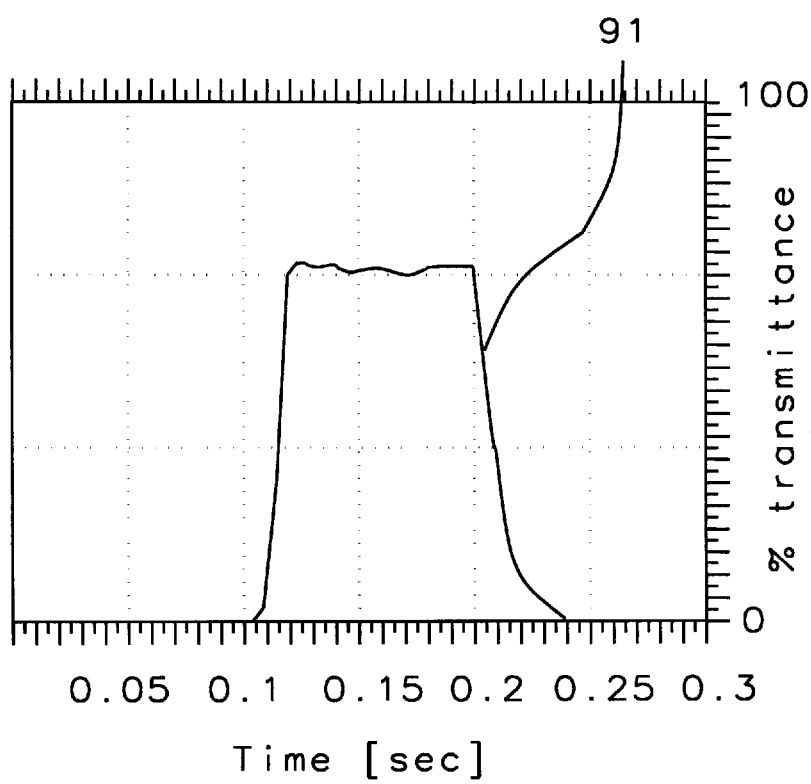
FIG. 9 is a timed response plot for a liquid crystal that has been stabilized according to the method of the present invention.

To illustrate the effectiveness of the present invention we show, in FIG. 8, curve 81 which is a plot of intensity (shown as % transmission vs. applied voltage. This confirms that the transition from zero to full transmission occurs over a narrow range between 3 and 5 volts. FIG. 9 shows the good response time of liquid crystal that has been stabilized according to the method of the present invention. Curve 91 is a plot of transmittance vs. time for Merck's 95-465 with 5% diacrylate monomer (Nippon Kayaku Co. R-712) and 0.1% hydroquinone as photoinitiator. 5 volts was applied at time 0.1 seconds and then removed at time 0.2 seconds. As can be seen, the response time (sum of rise and decay times) was about 20 milliseconds. The response times for the pure liquid crystal is between about 100 and 500 seconds.

While the invention has been particularly shown and described with reference to the preferred embodiments thereof, it will be understood by those skilled in the art that various changes in form and details may be made without departing from the spirit and scope of the invention.

What is claimed is:

1. A method for reducing stabilization time in a homogeneous liquid crystal, comprising:

providing an upper plate having a lower conductive surface;

providing a lower plate having an upper conductive surface that rests on a layer of photoresist having the form of a gibbous lattice;

adding an amount of an uncured monomer to the liquid crystal;

placing the liquid crystal between said conductive surfaces, disposed to be parallel to one another, and spaced a distance apart;

applying a voltage between said surfaces;

irradiating said homogeneous liquid crystal with ultraviolet light for a period of time while maintaining said voltage, with no phase separation occurring; and then terminating the application of said voltage, whereby defects that slow down director stabilization will not reform when said voltage is again applied and thereby reducing system response to about 20 milliseconds.

2. The method of claim 1 wherein said monomer is a diacrylate.

3. The method of claim 2 wherein said diacrylate monomer is methyl diacrylate.

4. The method of claim 1 wherein said monomer is a monoacrylate.

5. The method of claim 4 wherein said monoacrylate monomer is methyl monoacrylate or R-712 of Nippon Kayaku Corporation.

6. The method of claim 1 wherein the amount of added monomer is between about 0.1 and 3 weight %.

7. The method of claim 1 further comprising adding a photoinitiator to the liquid crystal.

8. The method of claim 7 wherein said photoinitiator is selected form the group consisting of hydroquinone and AIBN.

9. The method of claim 1 wherein the distance between the conductive surfaces is between about 1 and 10 microns.

10. The method of claim 1 wherein the applied voltage is between about 0 and 10 volts.

11. The method of claim 1 wherein the period of time for which the liquid crystal is irradiated with ultraviolet light is between about 0.1 and 19 minutes.

12. The method of claim 1 wherein said ultraviolet radiation has a wavelength between about 300 and 600 nm.

13. A method for manufacturing a liquid crystal display, having a wide viewing angle and a short stabilization time, comprising the sequential steps of:

providing upper and lower transparent dielectric substrates said lower substrate being coated with a layer of photoresist having the form of a gibbous lattice;

on each substrate, depositing a layer of a conductive material and then patterning and etching said layer to form parallel stripes having a width and a separation distance;

on each substrate, depositing a layer of a transparent conducting material whose thickness varies from between about 0.1 and 5 microns, directly above said stripes, to zero at a point midway between the stripes;

providing space between the substrates and then disposing them so that the deposited layers oppose, and are parallel to, each other and the stripes on the first substrate are orthogonal to the stripes on the second substrate;

permanently filling said space with a homogeneous liquid crystal to which an amount of an uncured monomer and an amount of a chiral dopant has been added;

applying a voltage between the deposited layers;

irradiating said homogeneous liquid crystal with ultraviolet light for a period of time while maintaining said voltage, with no phase separation occurring;

then terminating the application of said voltage, whereby defects that slow down director stabilization will not reform when said voltage is again applied and thereby reducing system response to about 20 milliseconds; and mounting the substrates between crossed polarizers.

14. The method of claim 13 wherein the transparent conductive material is indium tin oxide.

15. The method of claim 13 further comprising adding to the liquid crystal a photoinitiator selected from the group consisting of hydroquinone and AIBN.

16. The method of claim 13 wherein said stripe width is between about 1 and 50 microns.

17. The method of claim 13 wherein said stripe separation is between about 10 and 200 microns.

18. The method of claim 13 wherein the amount of added monomer is between about 0.1 and 3 weight%.

19. The method of claim 13 wherein the amount of added chiral dopant is less than about 5 weight %.

20. The method of claim 13 wherein the liquid crystal is Merck 95-465 or a liquid crystal having negative dielectric anisotropy.

* * * * *